United States Patent
Friborg et al.

(10) Patent No.: US 7,345,617 B2
(45) Date of Patent: Mar. 18, 2008

(54) APPARATUS FOR COLLECTING GROUND RADAR DATA WITH POLARIZATION INFORMATION

(75) Inventors: Johan Friborg, Vannasby (SE); Bernt Johansson, Mala (SE); Tommy Leijon, Nykoping (SE)

(73) Assignee: Mala Geoscience Forvaltnings AB, Mala (SE)

( * ) Notice: Subject to any disclaimer, the term of this patent is extended or adjusted under 35 U.S.C. 154(b) by 0 days.

(21) Appl. No.: 10/538,843

(22) PCT Filed: Dec. 9, 2003

(86) PCT No.: PCT/SE03/01914

§ 371 (c)(1),
(2), (4) Date: Oct. 4, 2005

(87) PCT Pub. No.: WO2004/055546

PCT Pub. Date: Jul. 1, 2004

(65) Prior Publication Data

US 2006/0097905 A1    May 11, 2006

(30) Foreign Application Priority Data

Dec. 13, 2002    (SE) .................................... 0203695

(51) Int. Cl.
*G01S 13/88* (2006.01)
*G01V 3/12* (2006.01)
*G01S 13/00* (2006.01)

(52) U.S. Cl. .......................... 342/22; 342/21; 342/27; 342/175; 342/188; 342/195

(58) Field of Classification Search .................. 342/21, 342/22, 27, 28, 70–82, 89, 175, 188, 195, 342/361–366, 450, 459; 343/872
See application file for complete search history.

(56) References Cited

U.S. PATENT DOCUMENTS 3,448,450 A * 6/1969 Alfandari et al. ............. 342/81

(Continued)

FOREIGN PATENT DOCUMENTS

DE    1954643    6/1970

OTHER PUBLICATIONS

Communication pursuant to Article 96(2) EPC for corresponding European Application No. 03 813 324.5-2220, dated Dec. 5, 2005, 4 pages.
International Search Report of PCT/SE2003/001914, mailed Feb. 26, 2004.

*Primary Examiner*—Bernarr E. Gregory
(74) *Attorney, Agent, or Firm*—Nixon & Vanderhye P.C.

(57) ABSTRACT

The present invention concerns an apparatus for collecting ground radar data with polarization information comprising a main body exhibiting structure for moving the apparatus along the ground, a part that rotates in relation to the main body supporting a pair of antennas of transmitter and receiver type, a power source with connected control unit for controlling and governing the ground radar, a transmitter unit electrically connected to one of the pair of antennas for generating and transmitting radar pulses and a sampler unit electrically connected to the other antenna for receiving the reflected radar pulses. To improve signal quality and reduce sensitivity to interference, the rotating pair of antennas support the transmitter unit, sampler unit and A/D converter contained in the sampler unit, the power source and the control unit are located in the main body and are electrically connected to the transmitter unit and sampler unit via a slip-ring arrangement, in which the radar signals are conveyed digitally via the slip ring arrangement.

9 Claims, 1 Drawing Sheet

U.S. PATENT DOCUMENTS

| | | |
|---|---|---|
| 4,181,850 A | 1/1980 | Fairbairn |
| 4,728,897 A * | 3/1988 | Gunton ................... 342/459 |
| 4,967,199 A | 10/1990 | Gunton et al. |
| 5,130,711 A * | 7/1992 | Kimura et al. ............ 342/22 |
| 5,227,799 A * | 7/1993 | Kimura et al. ............ 342/22 |
| 5,592,170 A * | 1/1997 | Price et al. ............... 342/22 |
| 6,388,629 B1 | 5/2002 | Albats, Jr. et al. |
| 6,552,336 B1 * | 4/2003 | Lloyd et al. .............. 342/22 |

\* cited by examiner

APPARATUS FOR COLLECTING GROUND RADAR DATA WITH POLARIZATION INFORMATION

This application is the U.S. national phase of international application PCT/SE2003/001914, filed 9 Dec. 2003, which designated the U.S. and claims priority of SE 0203695-2, filed 13 Dec. 2002, the entire contents of each of which are hereby incorporated by reference.

BACKGROUND OF THE INVENTION

The present invention concerns an apparatus for collecting ground radar data with polarization information.

In the following, polarization data is taken to mean including information on the electrical field direction of the radar wave.

Ground penetrating radar (GPR), also called ultra wideband radar, is a kind of time-dependent radar system characterized by its high bandwidth. Commercial GPR system have a typical bandwidth in excess of 1.

To study the characteristics of a land area or more generally a sample medium a radar system is used in which one antenna transmits electromagnetic signals and another antenna registers the signals that are reflected from the sample medium. The information that is registered can be analysed to establish the characteristics of the sample medium and to establish the position of objects enclosed in the medium. The transmitted signals will change depending on the construction of the radar system. Several transmitters and receivers can be used in a multi-channel system for special applications.

The transmitted electromagnetic waves have a number of properties that change as a result of their passage through the sample medium, reflection against objects and reflection against boundaries within the sample medium. These properties comprise amplitude, frequency, phase and polarization and are used to give a better picture of the conditions within the sample medium.

A linear or generally more linear-like reflector polarizes all the incoming electromagnetic fields so that they will be roughly parallel to the reflector after reflection. As a result of this, a radar system using linear polarized antennas will register maximum amplitude when both the transmitter and receiver antennas are oriented parallel to the linear reflector. Minimum amplitude is registered when both antennas are oriented perpendicular to the reflector. Intermediate orientations, between parallel and perpendicular, will give intermediate amplitudes. With different orientations of transmitter and receiver antennas, a number of additional cases can be achieved. All of these situations can be analysed qualitatively by ascertaining that maximum coupling to a linear reflector is obtained when the antenna is parallel to the reflector, irrespective of whether it is a transmitter or a receiver.

From U.S. Pat. No. 6,388,629 is known an apparatus that uses one or more rotating antennas with both transmitter and receiver elements. The antennas are contained in a housing and rotate relative to the ground and consequently also relative to the apparatus itself. The apparatus is located on a mobile unit used to move the apparatus along the ground. The apparatus also comprises a pulse generator, which is electrically connected to each transmitting element for the transmission of a radar pulse from one antenna and an A/D converter included in a sampler unit that is electrically connected to each receiver element for receiving radar pulses from the antenna. The device also comprises a data unit for storing collected readings, a power source and a control unit. For transferring signals between the said transmitter and receiver units and the A/D converter in the sampler unit, the apparatus comprises a slip-ring arrangement that acts between the antennas and the other units contained in the apparatus.

Thanks to the aforesaid type of ground radar apparatus with rotating antennas, it has been proven possible to achieve both improved signal quality and reduced sensitivity to interference.

However, the ambition is always to further improve both of these parameters, i.e. to improve signal quality and reduce sensitivity to interference.

SUMMARY OF THE INVENTION

One aspect of this invention is consequently to achieve an apparatus for collecting ground radar data with polarization information.

According to one example of the invention, there is provided a transmitter unit and sampler unit plus an A/D converter contained in the sampler unit being supported by a pair of antennas. A power source and a control unit are located in a main body and are electrically connected to the transmitter unit and sampler unit via a slip-ring arrangement. Thereby, only radar signals in digital form are transferred via the slip-ring arrangement. Since digital signals are considerably less sensitive to interference than analogue signals, the advantage is realized in that the analogue high frequency radar signals emitted from the transmitter unit are received by the sampler unit and converted to digital signals before being transferred via the slip-ring arrangement to the control unit in the main body for further processing.

This can be compared with known ground radar apparatus with rotating pairs of antennas where the other constituent parts of the ground radar used for processing radar signals, such as the power source, control unit and transmitter and sampler units are located in the main drive body of the ground radar. The disadvantage of this arrangement is obvious, since high frequency and consequently interference-sensitive signals via slip-ring arrangements or similar means of signal transfer must be transferred from the antennas to the sampling unit located in the main body. Not least, such an arrangement puts high demands on the signal transfer quality of the slip-ring arrangement or similar means of transferring signals between the antenna and the sampler. Because the sampler unit according to this invention is located on the rotating receiver antenna, the high frequency radar signals can be converted into digital signals before they are sent for further processing to the control computer in the main body via the slip-ring arrangement. This gives a number of advantages, amongst other things sensitivity to interference is reduced and it is possible to use cheaper and simpler slip-ring arrangements.

A slip-ring arrangement links the antennas and a power source located in the main body. The slip-ring arrangement offers a continuous electrical contact between the power source and the pair of antennas, whereby only digital control signals and DC voltages are transferred through it. Consequently only simple signals pass through the slip-ring arrangement and the number of signals passing through it is minimised.

Analogue HF equipment connected to the transmitter and receiver antenna can well be located in the housing. The extra weight this entails is practically negligible in comparison with the weight of the screens and RF damper used to make up the antenna housing.

Principally, the geometrical position of the antennas is determined by the angle sensor in which the geometrical position of the antennas is sent to the control unit.

Furthermore, the control unit governs the pair of antennas of transmitter and receiver type.

Principally, the control unit can be programmed to read the polarization information in an unlimited number of antenna positions. A large number of antenna positions increases the time needed for recording data but the large amount of data enables a more sophisticated conversion of the collected readings. The balance between the number of orientation directions and the measuring speed depends on the task in hand.

Embodiments of the present invention will be described below with reference to the attached drawing, which is only an example one embodiment of an apparatus for collecting ground radar data with polarization information according to the invention.

DETAILED DESCRIPTION OF PREFERRED EMBODIMENTS

Figure 1:
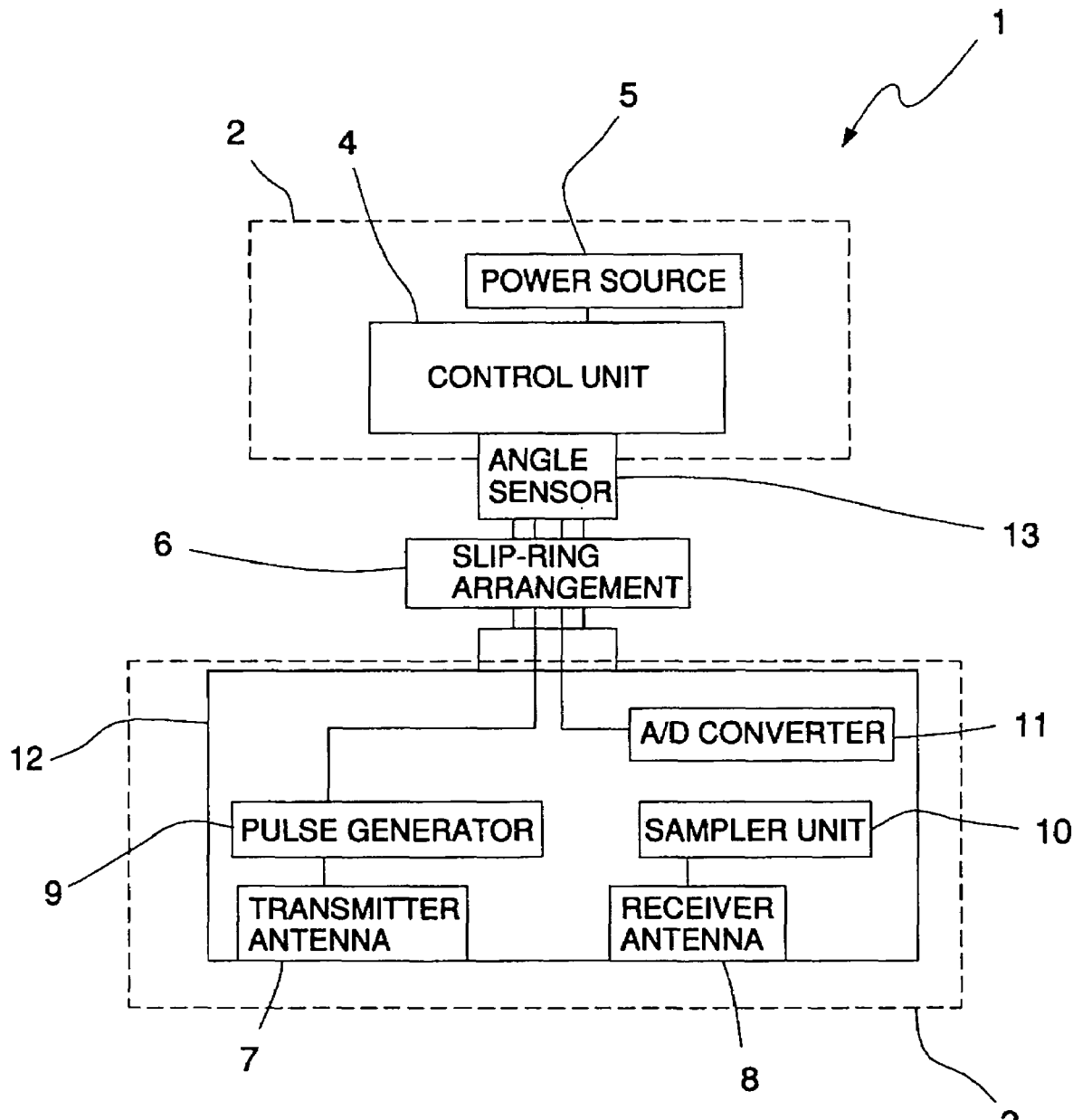
FIG. 1 in the drawings shows schematically the apparatus for collecting ground radar data with polarization information according to the invention.

The apparatus generally referred to with the number 1 comprises a main body 2 and a part 3 that is pivot mounted to the main body 2. The main body 2 of the apparatus 1 comprises a control unit 4 and a power source 5. A slip-ring arrangement 6 and an angle sensor 13 are located between the main body 2 and the part 3. The part 3 comprises a transmitter 7 and a receiver 8. The transmitter antenna 7 and the receiver antenna 8 are plane parallel and contained in a casing 12. The transmitter antenna 7 has an associated pulse generator 9 and the receiver antenna 8 has a sampler 10 and an analogue to digital A/D converter 11. Both the transmitter unit (9) and the sampler unit (10) are supported by the rotating pair of antennas (7, 8) like the A/D converter (11) included in the sampler unit. This design offers the advantage that the analogue high frequency radar signals sent from the transmitter unit can be received by the sampler unit and converted to digital signals before they are conveyed via the slip-ring arrangement to the control unit located in the main body for further processing.

A drive unit (not shown) is used to rotate the antenna casing 12 in relation to the main body 2.

In operation, the main body 2 of the apparatus 2 moves along the ground and the control unit 4 responding to a control program sends control signals through the slip-ring arrangement 6 to the pulse generator 9. The pulse generator initiates the transmitter antenna 7, which sends electromagnetic waves into the ground below. The radiation that is generated is received by the receiver antenna 8 and converted to digital form in the sampler 10 and A/D converter. The generated digital information is then conveyed through the slip-ring arrangement 6 to the control unit 4. The information can either be stored in the control unit 4 memory for later processing or be processed in real time with an on-board computer (not shown). The control unit 4 also governs the rotation or movement of the antennas 7, 8 located in the casing 12. The angle sensor 13 provides the control unit 4 with information on the geometric position of the antennas 7, 8.

Naturally, it should be understood that the invention is not limited to the details of the specific embodiment that is herein described only with the objective of serving as an example and that a number of changes and modifications are possible without departing from the idea of the invention as it is defined in the claims.

The invention claimed is:

1. Radar apparatus comprising a main body including structure to move the apparatus along the ground, a casing rotatable in relation to the main body and to support a transmitter and a receiver, a power source provided with a control unit to control the apparatus, a transmitter unit electrically connected to the transmitter to generate and transmit radar pulses and a sampler unit electrically connected to the receiver to receive reflected radar pulses, wherein the casing supports the transmitter unit, sampler unit and an A/D converter included in the sampler unit, and the power source and control unit are located in the main body and are electrically connected to the transmitter unit and sampler unit via a slip-ring arrangement, in which radar signals in digital form are conveyed via the slip-ring arrangement.

2. Radar apparatus according to claim 1, wherein the transmitter unit is supported by the transmitter.

3. Radar apparatus according to claim 2, wherein the sampler unit and the A/D converter are supported by the receiver.

4. Radar apparatus according to claim 1, wherein the transmitter unit comprises analogue high frequency equipment.

5. Radar apparatus according to claim 1, wherein the transmitter is a transmitter antenna.

6. Radar apparatus according to claim 1, wherein the receiver is a receiver antenna.

7. Radar apparatus according to claim 1, wherein the transmitter is configured to send electromagnetic waves into the ground below to generate said radar pulses.

8. Radar apparatus according to claim 7, wherein the receiver is set to convey the reflected radar pulses, after conversion, to the control unit via the slip-ring arrangement, and the control unit includes a memory to store the converted pulses as radar data.

9. Radar apparatus according to claim 8, wherein the radar data includes polarization information.

* * * * *